3,098,015
ENZYME PURIFICATION
Teuvo Pekka Äyräpää, Stockholm, Sweden, assignor to Ab Kabi, Stockholm, Sweden, a corporation of Sweden
No Drawing. Filed Jan. 8, 1962, Ser. No. 164,985
Claims priority, application Sweden Jan. 21, 1961
11 Claims. (Cl. 195—66)

The present invention relates to a method to remove non-desired physiologically active impurities such as noxious enzymes and fever-producing substances, so called pyrogens, from bacterial enzyme preparations containing streptokinase and streptodornase.

Streptokinase, an activator to the proenzyme plasminogen (profibrinolysin), found in blood, and streptodornase, a deoxyrebonuclease, are produced by cultivating β-hemolytic streptococci in a suitable medium from which the enzymes secreted by bacteria are precipitated after sterile filtration. Such precipitates are, however, always contaminated with various amounts of pyrogens and with enzymes like hemolysins and hyaluronidase. For clinical use such preparations must be purified.

Christensen (Journal of General Physiology 30, 1947, pp. 163–172) has purified streptokinase and streptodornase by precipitation of the bulk of impurities with protamine. This method has been developed by Ablondi and Nalesnyk (U.S. Pat. No. 2,677,642) which report that purer preparations and better yields are obtained by addition of calcium salts. Fletcher and Johnson (Proceedings of Society for Experimental Biology and Medicine 94, 1957, pp. 233–236) have purified streptokinase by several more complicated methods, as for example by zone electrophoresis in starch columns and have obtained preparations with high specific activity.

These methods, however, have some disadvantages. The purification with protamine draws rather high costs and does not remove hemolysin, which according to the method of Ablondi and Nalesnyk (U.S. Pat. No. 2,677,-643) is eliminated by binding this enzyme with cholesterol to an insoluble complex in a solution containing a suitable concentration of ethanol. The methods of Johnson and Fletcher give low yields and are difficult to adopt on a technical scale.

Movat, Krupka and Nalesnyk (U.S. Pat. No. 2,753,-291) have separated and purified streptokinase and streptodornase by an adsorption procedure in acid solution (pH-value below 2.5) with a subsequent fractionating elution. According to them the amount of toxic substances is reduced as a result of the action of the acid medium. The nature of the toxic substances thus removed is however not precised. Ablondi and Mills (U.S. Pat. No. 2,784,145) have developed another adsorption procedure with activated magnesiumsilicate (Florisil) as adsorbent. The method is claimed to be effective especially in separation of fairly pure streptokinase from streptodornase. There is however no data about to what extent the toxic substances are removed.

The references cited give no information about the degree of elimination of hyaluronidase in the procedures used. The commercial streptokinase-streptodornase preparations examined by me have been found to contain appreciable amounts of hyaluronidase. Because the hyaluronidase increases the permeability of capillaries, it is evidently desirable that this enzyme is eliminated from preparations for intravenous use.

The most important group of toxic substances in streptokinase-streptodornase preparations are the pyrogens. Although the nature of the pyrogens formed by the streptococci used in the production of the desired enzymes are not known, it was accepted as working hypothesis that they might be lipophilic substances attached rather firmly to proteins, possibly also to the streptokinase molecule. It is known that lipoprotein complexes may be broken down or the bond between protein and lipid weakened by various surface active agents. Consequently, the surface active agents might be capable of removing pyrogens from proteins.

Different surface active agents interact with proteins in specific conditions. Anionic surfactants combine with proteins in general on the acid side and cationic detergents on the alkaline side of the isoelectric point. They precipitate proteins, when applied in appropriate rations to proteins. The ionogenic surface active agents often have a denaturating effect on proteins, which effect increases with increasing temperature. Consequently they must be used at low temperatures. Nonionic surfactants are not in general considered to form complexes with proteins but they may affect the bond between protein and lipid and render the lipid extractable by organic solvents, or, if the surfactant is present in higher than critical micelle concentration, by the surfactant micelles themselves. The effect is in general not affected by pH. Increased temperature and presence of ethanol are known to facilitate the extraction of lipids from lipoproteins.

In the following a surface active agent (or surfactant) is defined as a substance, which contains both hydrophobic and hydrophilic groupings in such a manner that it has the property to form association colloids in water solutions.

According to the process of the present invention pyrogens are removed from streptokinase-streptodornase mixtures by addition of a surface active agent to the enzyme solution in conditions specified in Table A, based mainly on the known properties of different types of surface active agents to interact with proteins and lipoprotein complexes, after which treatment the enzymes are separated from the surface active agent annd recovered by methods depending on the properties of the surface active agent used. When nonionic surfactant or anionic surfactant of carboxylic acid type has been used, the enzymes are precipitated by adjusting the pH-value of the solution with any strong acid between 3 and 5 or by addition of any organic solvent, e.g. ethanol, leaving the surfactant and impurities to the solution. When anionic surfactant has been used, the surface active agent may be removed by precipitating it with an appropriate agent, e.g. sulfate esters may be removed as insoluble barium salts, or dialyzed out on the alkaline side of the isoelectric point of enzymes, after which the streptokinase and streptodornase are recovered by conventional protein precipitation. A cationic surfactant used may be removed by precipitating it out with an equivalent amount of an anionic surfactant, after which the enzymes are recovered from the supernatant by known conventional methods, e.g. by acid or ammonium sulfate precipitation.

The surface active agents are equally effective when applied to the crude fermentation mash containing streptokinase and streptodornase as to concentrated solutions of these enzymes in more or less purified state, prepared from the said mash.

TABLE A.—CONDITIONS WHEN USING DIFFERENT SURFACTANTS TO REMOVE PYROGENS

| Conditions | Surfactant used | | |
|---|---|---|---|
| | Non-ionic and carboxylic acid type | Anionic strong acid type | Cationic |
| pH | 7–8 | 3–5 | 7–9 |
| Temperature | +30° – +0° C. | 0(±5)° C. | 0(±5)° C. |
| Ionic strength | 0.01–0.1 | 0.01–1 | 0.01–1. |
| Concentration of surfactant. | 0.2–2% | 5–10 millimoles per gram protein nitrogen. | 5–10 millimoles per gram protein nitrogen. |

The method according to this invention is especially useful, as the undesired enzymes hemolysin and hyaluronidase are removed by the same operation. While the streptokinase and streptodornase are surprisingly stable towards the surface active agents, the activity of hemolysin and hyaluronidase is destroyed by these substances. The removal of the latter enzyme is evidently an inactivation effect. Particularly by treating the enzyme mixtures with nonionic surfactants it has been found that the hemolytic effect disappears although no protein is removed from solution.

The pyrogens are either inactivated or removed solubilized by the surface active agents. Observations made in the course of the purification of enzymes with nonionic surfactants point out to the latter alternative, while with anionic surfactants the former may be the case, at least partially.

It has been found that the surface active agents remove pyrogens and hemolysins from the whole protein fraction isoelectrically precipitated at pH 4. As this fraction contains also the streptodornase, this enzyme, when prepared from this fraction, will be equally hemolysin and pyrogen free as streptokinase.

The advantages of the method according to this invention are obvious, when comparing the pyrogenicity and hemolysin and hyaluronidase content in the preparations obtained according to this invention and in preparations obtained by conventional purification methods (e.g. by ammonium sulphate or alcohol fractionation or by adsorption methods).

When precipitating the enzymes directly from the fermentation mash by ethanol, preparations are obtained, which, injected to rabbits at a rate of 10,000 Christensen units streptokinase per kg. body weight, raise the temperature by 2–2.5° C. The corresponding temperature increase, when preparations obtained by conventional purification methods are injected, is generally 1–1.5° C. Preparations purified according to this invention generally do not cause higher increase than 0.5° C.; with some surfactant preparations completely free from pyrogens are obtained (cf. Table 7).

The hemolysin content in the alcohol- and salt-fractionated preparations has been of the order of 1000–5000 NIH units and their hyaluronidase content between 500 and 2000 viscosity reducing units, both expressed per 100,000 Christensen units of streptokinase. The preparations produced according to this invention have shown at highest 100 units hemolysin, but often much less, in some cases 1–2 units of hemolysin, and 1–2 units of hyaluronidase per 100,000 streptokinase units. The reduction of hemolysin content by treatment with various surface active agents is shown in Table 7.

The invention will be more particularly illustrated by the following examples, in which the starting material may be a sterile-filtered fermentation mash, obtained by growing β-hemolytic sterptococci of Lancefield Group C in a suitable medium principally according to Christensen (Journal of General Physiology 28, 1945, p. 363), or a pyrogenic and hemolysin-containing enzyme concentrate prepared from the said fermentation mash by an adsorption method.

The aim of Example 1 is to show that the pyrogens and hemolysin can be removed by a simple treatment of the fermented nutrition medium with a surface active agent, followed by repeated precipitation of the crude enzymes to remove completely the supernatant solution. However, in order to avoid operations with too voluminous solutions, it is in practice easier to begin by preparing an enzyme concentrate. By practical reasons it is also preferable to use ammonium sulfate as final precipitating agent, instead of several repeated identical precipitation steps, e.g. in order to get clear, easily sterile-filterable solutions. Further operation steps are needed when the ionogenic surfactants used are to be removed, because they form more stable complexes with proteins. By such reasons especially Examples 9 and 10, which describe the best mode of preparation according to this invention, seem relatively complicated.

The operations are, if not otherwise stated, carried out in cold room at 0 to +5° C. or in chilled solutions between −2° C. and +5° C. Only freshly distilled pyrogen free water has been used. The usual borate and phosphate buffers have the following composition:

(a) Borate buffer: 11.1 g. $H_3BO_3$, 8.1 g. $Na_2B_4O_7 \cdot 10H_2O$ and 9.0 g. NaCl, pH=7.9; when needed, adjusted to other values, by 3–4 molar hydrochloric acid or by sodium hydroxide.

(b) Phosphate buffer: 1.85 g. $NaH_2PO_4 \cdot 2H_2O$, 12.0 g. $Na_2HPO_4 \cdot 2H_2O$ and 9.0 g. NaCl per litre, pH=7.4.

The borate buffer is used as a standard buffer for preparative purposes. For injection the preparations are in general finally dialyzed against phosphate buffer. The presence of a mixed phosphate-borate buffer in the starting material depends on the concentration procedure employed. None of these buffers has any specific effects on the interaction of surface active agents with proteins.

*Example 1*

9 litres of sterile-filtered fermented mash with an activity of 1050 Christensen units streptokinase and 200 Christensen units streptodornase per cc. was adjusted with 1 molar sodium hydroxide solution to pH 7.8 and to this solution there was added with stirring 45 grams of polyoxyethylene sorbitan monolaurate (marketed as "Tween 20" by Atlas Powder Co.) dissolved in 1 litre of 96% ethanol. The solution was placed in a thermostat, adjusted to +39° C. and held there with slow stirring for 30 minutes, measured from the moment when the enzyme containing solution had attained a temperature of +34° C. The solution was then cooled rapidly to about 0° C. and adjusted to pH 4.0 with 3 molar hydrochloric acid, which precipitated the enzymes. This precipitate was collected by centrifugation after two hours (at 0° C.). In order to remove the supernatant liquid remaining in the precipitate the precipitation procedure was then repeated twice as follows: the precipitate was dissolved in 250 cc. of borate buffer containing 10% by volume ethanol, in order to aid the precipitation of the enzymes, the pH-value of the solution was adjusted as above to 4.0 and the precipitate formed was collected by centrifugation at 1000×g. Finally the enzyme containing precipitate was dissolved in 100 cc. of phosphate buffer and clarified by centrifugation at 3000×g. The yield was 110 cc. of solution containing 33,000 units streptokinase (yield 39%) and 1700 units streptodornase (yield 10%) per cc. The results of pyrogen and hemolysin tests are shown in Table 7.

*Example 2*

To 265 cc. of a crude pyrogenic streptokinase solution prepared from fermented mash by an adsorption method, and containing 51,000 streptokinase units per cc., in a buffer containing 0.033 mole trisodium phosphate and 0.16 mole boric acid per litre, adjusted to pH 7.4, there was added 1.5 g. of polyoxyethylene sorbitan monooleate (which is marked as "Tween 80" by Atlas Powder Co.), dissolved in 30 cc. of 96% ethanol. The solution was placed in a thermostate adjusted to +37° C. and held there with slow stirring for 30 minutes, measured from the moment when the solution has attained +34° C. After the solution was cooled to 0° C., 30 cc. of 96% ethanol was added, in order to get complete precipitation of the enzyme, when the pH of the solution was then lowered to 4.0 by 4 molar hydrochloric acid. The streptokinase precipitated was collected by centrifugation, dissolved in 100 cc. of borate buffer, pH 7.9, containing 10% by volume ethanol and precipitated again by adjusting the pH-value to 4.0, in order to wash out the remaining surfactant with toxic impurities. The streptokinase precipitate was collected by centrifugation, dissolved in 100 cc. of phosphate buffer, and precipitated by equal volume of saturated ammonium sulphate solution. The precipitate was collected by centrifugation, dissolved in 50 cc. of phosphate buffer and dialyzed against 1 litre of the same buffer, changed two times, for 20 hours. The yield was 56 cc. of solution containing 160,000 streptokinase units per cc. (67%). The preparation was free from pyrogens and hemolysins as shown in Table 7.

*Example 3*

To 265 ml. of the same crude streptokinase solution which was used in Example 2, there was added 1.5 g. of nonyl phenol with ether-linked polyethylene oxide (which is marketed as "Berol WASC" by Berol AB, Goteborg, Sweden), dissolved in 30 cc. of 96% ethanol. The preparation was then continued exactly as in Example 2. The yield was 39 cc. of solution with an activity of 180,000 streptokinase units per cc. (50%). The preparation was free from pyrogens and hemolysins as shown in Table 7.

*Example 4*

To 265 cc. of crude streptokinase solution, prepared and buffered as the starting material in Example 2, containing 51,000 streptokinase units per cc., there was added 1.5 g. of sorbitan monopalmitate (which is marketed as "Span 30" by Atlas Powder Co.), dissolved in 30 cc. of 96% ethanol. The mixture was placed in a thermostat, adjusted to +37° C., held there with slow stirring for 30 minutes, measured from the moment when the suspension had attained 34° C. and then cooled to 0° C. As the streptokinase could not be separated from this suspension by acid precipitation (as in Examples 1, 2 and 3), depending on the high viscosity of the suspension, it was precipitated by adding to the solution 500 cc. of cold 99% ethanol, by the manner described in Example 5. The precipitate was washed and dissolved as in Example 5 (but with four times greater volumes). To 400 cc. of solution thus obtained and cleared by centrifugation at 3000×g, there was added 400 cc. of saturated ammonium sulfate solution, the enzyme precipitate collected by centrifugation and dissolved in 30 cc. of phosphate buffer and dialyzed against the same buffer, changed twice, for 40 hours. The yield was 29 cc. of solution containing 135,000 streptokinase units per cc. (39%). The results of pyrogen tests are given in Table 7.

*Example 5*

To 90 cc. of crude streptokinase solution, prepared and buffered as the starting material in Example 2, containing 100,000 streptokinase units per cc., there was added 400 milligrams of sodium deoxycholate, dissolved in 10 cc. of 96% ethanol, whereupon the pH value, raised by this addition, was brought again to 7.9. The solution was then placed in a thermostat at +37° C. for 10 minutes and then cooled to 0° C. As deoxycholic acid is not soluble in water in acid solution, it cannot be separated from streptokinase by precipitation of the enzyme at pH 4 (as e.g. surfactants used in Examples 1, 2 and 3). In order to accomplish the separation the enzyme was precipitated by adding slowly to the solution an ice bath with stirring 200 cc. of 99% ethanol, centrifuging down the precipitate and washing it 3 times with 100 cc. of cold (at −5° C.) 75% ethanol. The deoxycholate was thus removed in the supernatant. The precipitate was suspended in 100 cc. of phosphate buffer, brought to solution by adjusting the pH in the mixture to 12 with 5 molar sodium hydroxide, whereupon the pH of solution was returned to 7.4 with 4 molar hydrochloric acid. To the solution there was added its own volume of saturated ammonium sulfate solution, which precipitated all the streptokinase. The precipitate was dissolved in 20 cc. of phosphate buffer and dialyzed (as in Example 4). The dialyzed turbid solution was cleared by centrifugation at 2000×g for 30 minutes. The yield was 23 cc. of solution containing 111,000 streptokinase units per cc. (29%). The results of pyrogen tests are shown in Table 7.

*Example 6*

To 20 litres of sterile filtered fermentation mash containing 14.4 million streptokinase units there was added with stirring at pH 7.5 and at 0° C. 20 cc. of 2% sodium dodecyl sulfate solution (prepared at room temperature). In order to get an insoluble complex between the dodecyl sulfate anion and proteins (including enzymes), there was added such an amount of 4 molar hydrochloric acid that the pH-value of solution was lowered to 4.1. In order to get complete precipitation of enzymes there was added 4 litres of cold 96% ethanol, after which the pH-value again was adjusted to pH 4.1. The slightly opalescent solution was stored at −5° C., overnight and the precipitate formed was collected by centrifugation next morning.

The precipitate was dissolved in 250 cc. of borate buffer at pH 7.4 and to the solution there was added 40 cc. of 1% barium chloride solution, in order to remove the dodecyl sulfate. The barium dodecyl sulfate precipitated was removed by centrifugation after some hours and washed once with 50 cc. of borate buffer, pH 7.4. The two supernatant solutions were brought together and diluted to 400 cc., whereupon 80 cc. of saturated ammonium sulfate solution was added in order to remove the excess of barium ions and some inactive protein material. The precipitate was removed by centrifugation after some hours. The streptokinase and streptodornase were then precipitated in two separate fractions according to methods, which in principle are known (Christensen, Journal of General Physiology 28, 1945, p. 363): streptokinase was precipitated by adding to the solution its own volume of saturated ammonium sulfate solution and collected by centrifugation, after which the supernatant was dialyzed fairly free from ammonium sulfate against dilute magnesium sulfate solution (cf. Christensen, l.c.) and streptodornase precipitated from this solution by adjusting pH to 4.0. Both enzyme precipitates were dissolved in phosphate buffer, dialyzed against the same, sterile-filtered and lyophilized.

The yields at successive preparation stages are given in Table 1. The results of pyrogen tests with six rabbits are given in Table 2. The preparation was found to be substantially free from hemolysin and hyaluronidase and passed toxicity tests without remarks. The preparation has been found to be stable for at least 4 years.

TABLE 1.—THE YIELDS AT SUCCESSIVE PREPARATION STAGES IN EXAMPLE 6

| Preparation stage | Streptokinase activity | | Streptodornase activity | |
|---|---|---|---|---|
| | 10⁴ Christensen units | Yield, percent | 10⁴ Christensen units | Yield, percent |
| Sterile filtered fermentation mash | 14.4 | 100 | 4.0 | 100 |
| Precipitated by dodecyl sulfate, dissolved in borate buffer | 8.3 | 57 | 3.75 | 94 |
| After ammonium sulfate precipitation | 7.75 | 54 | 3.2 | 80 |
| Final sterile product | 7.0 | 49 | 2.3 | 57 |

TABLE 2.—PYROGEN TESTS WITH THE PREPARATION OBTAINED ACCORDING TO EXAMPLE 6

[10,000 units streptokinase + 2,500 units streptodornase per kg. body weight injected intravenously]

| Rabbit No. | Temperature increase after— | | | Mean value for temp. increase | Absolute maximum for temp. increase |
|---|---|---|---|---|---|
| | 1 hour | 2 hours | 3 hours | | |
| 1 | 0.0 | 0.0 | 0.2 | | |
| 2 | 0.3 | 0.1 | 0.2 | | |
| 3 | 0.1 | 0.2 | 0.2 | 0.2 | 0.5 |
| 4 | 0.0 | 0.0 | 0.0 | | |
| 5 | 0.1 | 0.3 | 0.5 | | |
| 6 | 0.1 | 0.1 | 0.2 | | |

*Example 7*

To 91 cc. of crude streptokinase solution, prepared and buffered as the starting material in Example 2, containing 90,000 streptokinase units per cc., adjusted to pH 8.0 with 1 molar sodium hydroxide there was added with cooling on an ice bath 9 cc. of 0.1 molar (about 4.5%) suspension of sodium di-(2-ethylhexyl)sulfosuccinate (which is marketed as "Aerosol OT" by American Cyanamid Co.). After 10 minutes the pH value of the solution was adjusted to 4.0 by 4 molar hydrochloric acid. The streptokinase precipitated was collected by centrifugation and washed once with borate buffer, to which had been added 10% of its own volume of 96% ethanol and adjusted to pH 4.0. The precipitate was then suspended in 50 cc. of borate buffer at pH 7.4. As barium chloride did not give any precipitate in this suspension, the surface active agent was removed by dialysis against borate buffer, pH 7.9 for 48 hours. (The removal was, however, not complete.) The solution turbid by denatured protein, was cleared by centrifugation and then there was added an equal volume of saturated ammonium sulfate solution. The streptokinase precipitated was collected by centrifugation, dissolved in 10 cc. of phosphate buffer, pH 7.4, and dialyzed against the same buffer, changed two times, for 20 hours. The yield was only 16%. The result of pyrogen test is shown in Table 7.

*Example 8*

To 380 cc. of crude streptokinase solution, prepared and buffered as starting material in Example 2, adjusted to a pH-value of 8.3 with 4 molar sodium hydroxide and containing 30,000 streptokinase units per cc., there was added with cooling in ice bath 20 cc. of 2% solution of cetyltrimethyl ammonium bromide (prepared at room temperature). The more alkaline medium than usual was preferred in the purpose to promote the combination of the cationic surfactant with proteins. In order to remove the cationic agent there was added after 5 minutes 23 ml. of 0.05 molar solution of sodium dodecyl sulfate. This amount was previously found by titration (according to Hillenbrand, Sutherland and Hogsett, Analytical Chemistry 23, 1951, pp. 626–627) to be exactly equivalent to the added amount of cetyltrimethyl ammonium bromide. A cloudy precipitate was formed immediately and became coarser, when the pH of the suspension was adjusted to 6.4 with 4 molar hydrochloric acid. This precipitate, being cetyltrimethylammonium salt of dodecylsulfuric acid, was removed by centrifugation after 20 hours. To the supernatant there was then added 44 cc. of 96% ethanol and the pH-value of the solution was lowered to 4.0 with 4 molar hydrochloric acid. The streptokinase precipitated was dissolved in 100 cc. of phosphate buffer, pH 7.4 and an equal volume of saturated ammonium sulfate solution was added. The streptokinase precipitate thus obtained was centrifuged and dissolved in 30 cc. of phosphate buffer, pH 7.4 and dialyzed as in Example 2. The yield was 33 cc. of solution containing 110,000 streptokinase units per cc. (32%). The results of pyrogen tests are shown in Table 7.

That the pyrogen removing effect is due to cetyltrimethylammoniumbromide and not to dodecylsulfate is obvious, because the complex between cationic and anionic surfactants is formed immediately at the addition of dodecyl sulfate and as the latter surfactant is completely removed before the pH is lowered to such values, where a combination between enzyme protein and dodecyl sulfate is possible.

*Example 9*

To 3.25 litres of crude, concentrated, pyrogenic streptokinase solution, prepared from the fermented mash by an adsorption method and containing 800 million streptokinase units, in a buffer containing 0.033 mole of trisodium phosphate and 0.16 mole of boric acid per litre, adjusted to pH 7.8, there was added 20 grams of polyoxyethylene sorbitan monolaurate (which is marketed as "Tween 20" by Atlas Powder Co.) and 400 cc. of 96% ethanol, in order to facilitate the precipitation in the following preparation stages and to increase the effect of the surfactant used. The solution was diluted to 4 litres with distilled water and placed in a thermostat, adjusted to +39° C. and held there with slow stirring for 30 minutes, measured from the moment when the enzyme solution had attained a temperature of +34° C. The solution was then cooled rapidly to about +15° C. and the inactive precipitate formed during heating was removed by centrifugation at 1000×g for 30 minutes. The supernatant solution containing practically all the streptokinase was adjusted to pH 4.0 at 0° C. with 3 molar hydrochloric acid and the enzyme precipitate was collected by centrifugation (at 0° C.). In order to remove the remaining supernatant, containing surface active agent and toxic impurities, the precipitate was redissolved in 4 litres of borate buffer containing 400 ml. of 96% ethanol, at pH 7.9. The streptokinase was precipitated again by adjusting the pH-value of this solution to 4.0. The precipitate was redissolved in 1 litre of borate buffer, pH 7.4, and precipitated by adding to this solution its own volume of saturated ammonium sulfate solution. The prceipitate formed was dissolved in phosphate buffer and dialyzed against the same buffer, changed twice, for 20 hours. The dialyzed solution was sterile filtered and lyophilized. The yields and the results of pyrogen tests are shown in Tables 3 and 4. The preparation was also free from hyaluronidase.

TABLE 3.—THE YIELDS AT THE SUCCESSIVE PREPARATION STAGES IN EXAMPLE 9

| Preparation stage | Streptokinase activity 10⁶ Christensen units | Yield, percent |
|---|---|---|
| Crude streptokinase concentrate | 800 | Taken as 100 |
| Supernatant after heating with "Tween 20." | 725 | 91 |
| Precipitate after second acid precipitation at pH 4.0. | 700 | 88 |
| Final product | 700 | 88 |

TABLE 4.—PYROGEN TEST WITH THE PREPARATION OBTAINED ACCORDING TO EXAMPLE 9

[10,000 Streptokinase units per kg. body weight injected intravenously]

| Rabbit No. | Temperature increase after— | | | Mean value for temp. increase | Absolute maximum for temp. increase |
| --- | --- | --- | --- | --- | --- |
| | 1 hour | 2 hours | 3 hours | | |
| 1 | 0.1 | 0.2 | 0.3 | | |
| 2 | 0.0 | 0.0 | 0.0 | | |
| 3 | 0.0 | 0.0 | 0.0 | 0.2 | 0.3 |
| 4 | 0.2 | 0.2 | 0.3 | | |
| 5 | 0.0 | 0.2 | 0.2 | | |
| 6 | 0.2 | 0.0 | 0.2 | | |

*Example 10*

To 23 litres of sterile filtered fermentation mash, containing 43.5 million streptokinase units, there was added at pH 7.5 and at 0° C. 23 cc. of 3% sodium dodecyl sulfate solution. The operations were then conducted as described in Example 6, except that the volume ethanol added was 5.7 litres. After centrifugation the precipitate obtained was dissolved in 500 cc. of borate buffer at pH 7.6 and to this solution there was added 50 cc. of 2% barium chloride solution in order to remove dodecyl sulfate. After 18 hours at +4° C. the barium dodecyl sulfate was removed by centrifugation. To the supernatant solution there was added 160 cc. of saturated ammonium sulfate solution, whereupon the barium sulfate and a small quantity of inactive proteinaceous material precipitated were removed by centrifugation. To the supernatant there was added 400 cc. of saturated ammonium sulfate solution, and the flocculated precipitate containing practically all the streptokinase was collected by centrifugation and dissolved in 200 cc. of borate buffer at pH 7.6.

In order to raise the degree of purity of streptokinase, the precipitation with sodium dodecyl sulfate was repeated as follows: in the solution obtained as described above there was dissolved 4 g. of sodium chloride, the mixture was placed on ice bath and to it was added with stirring 5 cc. of 10% sodium dodecyl sulfate. After 5 minutes there was added slowly with stirring 1 molar hydrochloric acid until the pH-value was lowered to 4.0. After further 5 minutes the precipitate formed was collected by centrifugation.

The precipitate was redissolved in 200 cc. of borate buffer at pH 7.6 and to this solution there was added 60 cc. of 2% barium chloride solution. The barium dodecyl was removed by centrifugation next day, to the solution (volume 280 cc.) there was added 90 cc. of saturated ammonium sulfate solution and the barium sulfate together with some inactive protein was removed by centrifugation. The streptokinase in the supernatant was then precipitated as in Example 6. The yields at preparation stages and the results of pyrogen test are shown in Tables 5 and 6. The preparation was free from hemolysin (cf. Table 7) and hyaluronidase.

TABLE 5.—THE YIELDS AT SUCCESSIVE PREPARATION STAGES IN EXAMPLE 10

| Preparation stage | Streptokinase activity 10⁶ Christensen units | Yield, percent |
| --- | --- | --- |
| Sterile filtered fermentation mash | 43.5 | 100 |
| First dodecyl sulfate precipitate, redissolved and surfactant removed as barium salt | 23 | 53 |
| The final product | 20 | 46 |

TABLE 6.—PYROGEN TEST WITH THE PREPARATION OBTAINED ACCORDING TO EXAMPLE 10

[10,000 streptokinase units per kg. body weight injected intravenously]

| Rabbit No. | Temperature increase after— | | | Mean value for temp. increase | Absolute maximum for temp. increase |
| --- | --- | --- | --- | --- | --- |
| | 1 hour | 2 hours | 3 hours | | |
| 1 | 0.0 | 0.0 | 0.0 | | |
| 2 | 0.3 | 0.2 | 0.1 | | |
| 3 | 0.0 | 0.0 | 0.0 | 0.05 | 0.3 |
| 4 | 0.0 | 0.0 | 0.0 | | |
| 5 | 0.0 | 0.0 | 0.0 | | |
| 6 | 0.0 | 0.0 | 0.0 | | |

TABLE 7.—A SUMMARY OF PYROGEN AND HEMOLYSIN CONTENTS IN PREPARATIONS OBTAINED WITH DIFFERENT SURFACE ACTIVE AGENTS, COMPARED WITH PREPARATIONS OBTAINED BY CONVENTIONAL METHODS

[10,000 Christensen units streptokinase per kg. body weight injected intravenously. Each preparation tested on at least 3 rabbits. The highest values of temperature increase observed during 3 hours on each rabbit are given. Hemolysin assayed according to the method of National Institutes of Health]

| Purification procedure | Temperature increase at pyrogen test | | | Hemolysin units per 100,000 units streptokinase |
| --- | --- | --- | --- | --- |
| Streptokinase purified by conventional methods (precipitation with alcohol, ammonium sulfate, acid, and adsorption) | 1.3 | 1.8 | 1.5 | 1,000–2,000 |
| Crude streptokinase concentrate, prepared from the fermented mash by an adsorption method (starting material in Ex. 2–5 and 7–9) | 1.7 | 1.6 | 1.8 | 10,000 |
| Polyoxyethylene sorbitan monolaurate (Ex. 1) | 0.4 | 0.4 | 0.2 | 10 |
| Polyoxyethylene sorbitan monooleate (Ex. 2) | 0.0 | 0.4 | 0.0 | 2 |
| Nonylphenol-polyethylene oxide (Ex. 3) | 0.0 | 0.1 | 0.0 | 2 |
| Sorbitan monopalmitate (Ex. 4) | 0.0 | 0.4 | 0.2 | 40 |
| Deoxycholate (Ex. 5) | 0.0 | 0.3 | 0.2 | 100 |
| Dodecyl sulfate (Ex. 6) | {0.0 / 0.0} | 0.3 / 0.0 | 0.0 / 0.0 | c:a 2 |
| Di-(2-ethylhexyl)sulfosuccinate (Ex. 7) | 0.8 | 0.5 | 0.7 | (Not assayed) |
| Cetyltrimethylammoniumbromide (Ex. 8) | 0.5 | 0.8 | 0.2 | 50 |
| Polyoxyethylene sorbitan monolaurate (Ex. 9) | {0.3 / 0.3} | 0.0 / 0.2 | 0.0 / 0.2 | c:a 1 |

I claim:

1. The method for purifying enzymes selected from the group consisting of streptokinase, streptodornase, and mixtures thereof to render the same substantially free of impurities such as pyrogens, hemolysins and hyaluronidase, that comprises treating a starting material, selected from the group consisting of filtered mash produced by fermentation of streptococci in suitable nutrient medium and enzyme concentrates prepared therefrom, at a buffered alkaline pH with a surface active agent selected from the group consisting of anionic, cationic and nonionic surface active agents having the capacity to form association colloids in water solution, whereby an interaction between said surface active agent and impurities is attained inactivating the same without substantial impairment of said enzymes, and separating said enzymes from the surface active agent preparatory to concentration and recovery of said enzymes by known methods.

2. The method of claim 1 wherein said enzymes are separated by precipitation from an acid solution of the surface active agent.

3. The method of claim 1 wherein the surface active agent is separated by precipitating an insoluble derivative thereof from a solution containing said enzymes.

4. The method of claim 1 wherein the surface active agent is a sulfuric acid ester and is removed from the enzyme solution by precipitation as barium salt in neutral to alkaline medium.

5. The method of claim 1 wherein the surface active agent is of cationic type and is removed from the enzyme solution by precipitation with an equivalent amount of anionic surface active agent in essentially neutral medium.

6. The method of claim 1 wherein the surface active agent is of acid-soluble nonionic type which is incubated with the enzyme mixture at a temperature between 0° C. and +50° C., and the said enzymes are precipitated by adjusting the solution to an acid pH-value, leaving the surface active agent and impurities in the supernatant solution.

7. The method of claim 1 wherein the surface active agent is of acid-soluble nonionic type, which is incubated with the enzyme mixture at a temperature between 0° C. and +50° C., and the said enzymes are precipitated with such an organic liquid that the surface active agent and impurities are left to the supernatant solution.

8. The method of claim 1 wherein a nonionic surface agent is employed which is soluble at acid pH, and said enzymes are separated by precipitation at a pH of about 4 from a solution containing said surface active agent.

9. The method of claim 1 wherein a nonionic surface active agent is employed which is insoluble at acid pH, and said enzymes are separated by diluting a solution containing both enzymes and surface active agent with about 1.5 to 2 volumes of 99% ethanol to precipitate said enzymes.

10. The method of claim 1 wherein an anionic surface active agent is employed and the enzyme solution, after treatment with said surface active agent, is acidified to about pH 4 to precipitate surface active agent and enzymes, the precipitate is then dissolved in alcohol and the surface active agent is precipitated as an insoluble barium salt.

11. The method of claim 1 wherein a cationic surface active agent and the enzyme solution, after treatment with said surface active agent is combined with an equivalent amount of an anionic surface active agent reactive with said cationic surface active agent to form a cationic-anionic complex precipitate, and the supernatant solution is acidified to precipitate said enzymes.

References Cited in the file of this patent
UNITED STATES PATENTS

| | | |
|---|---|---|
| 2,537,933 | Lott et al. | Jan. 9, 1951 |
| 2,537,934 | Lott et al. | Jan. 9, 1951 |
| 3,060,102 | Singher et al. | Oct. 23, 1962 |